United States Patent
Thompson

(10) Patent No.: US 8,090,813 B2
(45) Date of Patent: Jan. 3, 2012

(54) METHODS AND APPARATUS FOR DATA TRANSFER

(75) Inventor: Mark Thompson, Tempe, AZ (US)

(73) Assignee: Solid State Networks, Inc., Tempe, AZ (US)

( * ) Notice: Subject to any disclaimer, the term of this patent is extended or adjusted under 35 U.S.C. 154(b) by 666 days.

(21) Appl. No.: 11/857,555

(22) Filed: Sep. 19, 2007

(65) Prior Publication Data
US 2008/0071907 A1   Mar. 20, 2008

Related U.S. Application Data

(60) Provisional application No. 60/826,210, filed on Sep. 19, 2006.

(51) Int. Cl.
*G06F 15/173* (2006.01)

(52) U.S. Cl. ........ 709/223; 709/201; 709/224; 709/242; 709/227; 709/217

(58) Field of Classification Search .................. 709/201, 709/223–224, 242, 227, 217
See application file for complete search history.

(56) References Cited

U.S. PATENT DOCUMENTS

| | | | |
|---|---|---|---|
| 2003/0217140 A1* | 11/2003 | Burbeck et al. | 709/224 |
| 2006/0212584 A1* | 9/2006 | Yu et al. | 709/227 |
| 2006/0218222 A1* | 9/2006 | Brahmbhatt et al. | 709/201 |
| 2007/0288593 A1* | 12/2007 | Wang | 709/217 |
| 2008/0005336 A1* | 1/2008 | Cohen et al. | 709/227 |

OTHER PUBLICATIONS

Arun Chokkalingam & Firasath Riyza, "BitTorrent Protocol Specification V 1.0", Dec. 12, 2004.*
Bram Cohen, "Incentives Build Robustness in BitTorrent", May 22, 2003.*

* cited by examiner

*Primary Examiner* — Wing Chan
*Assistant Examiner* — Benjamin M Thieu
(74) *Attorney, Agent, or Firm* — The Noblitt Group PLLC

(57) ABSTRACT

Methods and apparatus for an efficient peer-to-peer (p2p) system generally includes a server selection mechanism connected to a p2p network. The server selection mechanism may be configured to maintain a list that describes the servers which are storing at least a portion of a specified file. The server selection mechanism may be configured to selectively distribute at least a portion of the file between servers, for example according to the description in the list.

9 Claims, 5 Drawing Sheets

METHODS AND APPARATUS FOR DATA TRANSFER

CROSS-REFERENCES TO RELATED APPLICATIONS

This application claims the benefit of U.S. Provisional Patent Application No. 60/826,210, filed Sep. 19, 2006 and incorporates the disclosure of that application by reference.

BACKGROUND OF INVENTION

As more digital content becomes available on the Internet, peer-to-peer (p2p) networks have been developed to distribute it. Without access to a p2p network, users may be required to download content from a single web server. To provide a satisfactory user experience, the web server must have sufficient bandwidth to send the file to all users within an acceptable time frame. As the number of simultaneous users grows, however, bandwidth costs can become prohibitively expensive. P2p networks, on the other hand, rely upon the bandwidth and computing power of all the clients of the p2p network to distribute files, rather than the bandwidth of a single web server. As a result, bandwidth requirements for a particular web server can be greatly diminished.

Unfortunately, p2p networks can become quite inefficient. Generally, the networks work by splitting the file to be distributed into segments. These file segments may then be distributed among the clients of the p2p network. As new users log onto the system, they can retrieve the file segments from various other p2p network clients. Because p2p network clients are constantly joining and leaving the network, however, the particular file segments that are available for download are constantly changing, as is the number of p2p clients that can provide those file segments. As a result, some file segments may only be available from a small number of p2p clients—greatly diminishing network performance—or may, in fact, become totally unavailable. When the file segments of a particular file are evenly distributed among the peers of a p2p network, the p2p network is said to have high peer efficiency; conversely, when the file segments of a particular file are unevenly distributed among the peers of a p2p network or unavailable, the p2p network is said to have low peer efficiency.

SUMMARY OF THE INVENTION

Methods and apparatus for data transfer according to various aspects of the present invention operate in conjunction with a data transfer system connected to a peer-to-peer (p2p) network. The network may transfer data in the form of files comprised of file segments. The data transfer system monitors an availability of the file segments via the p2p network, and automatically adjusts the availability of the file segments according to the availability of the file segments.

BRIEF DESCRIPTION OF THE DRAWING FIGURES

A more complete understanding of the present invention may be derived by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in a different order are illustrated in the figures to help to improve understanding of embodiments of the present invention.

DETAILED DESCRIPTION OF EXEMPLARY EMBODIMENTS

The present invention may be described in terms of operational block components and various processing steps. Such operational block components may be realized by any number of hardware or software components configured to perform the specified functions and achieve the various results. For example, the present invention may employ various processing techniques, networking protocols, e.g., the file transfer protocol known under the name BitTorrent, and the like, which may carry out a variety of functions. In addition, the present invention may be practiced in conjunction with any number of networking configurations, and the system described is merely one exemplary application for the invention. Further, the present invention may employ any number of conventional techniques for storing files, parsing files, reconstituting files, executing files, etc.

Figure 1:
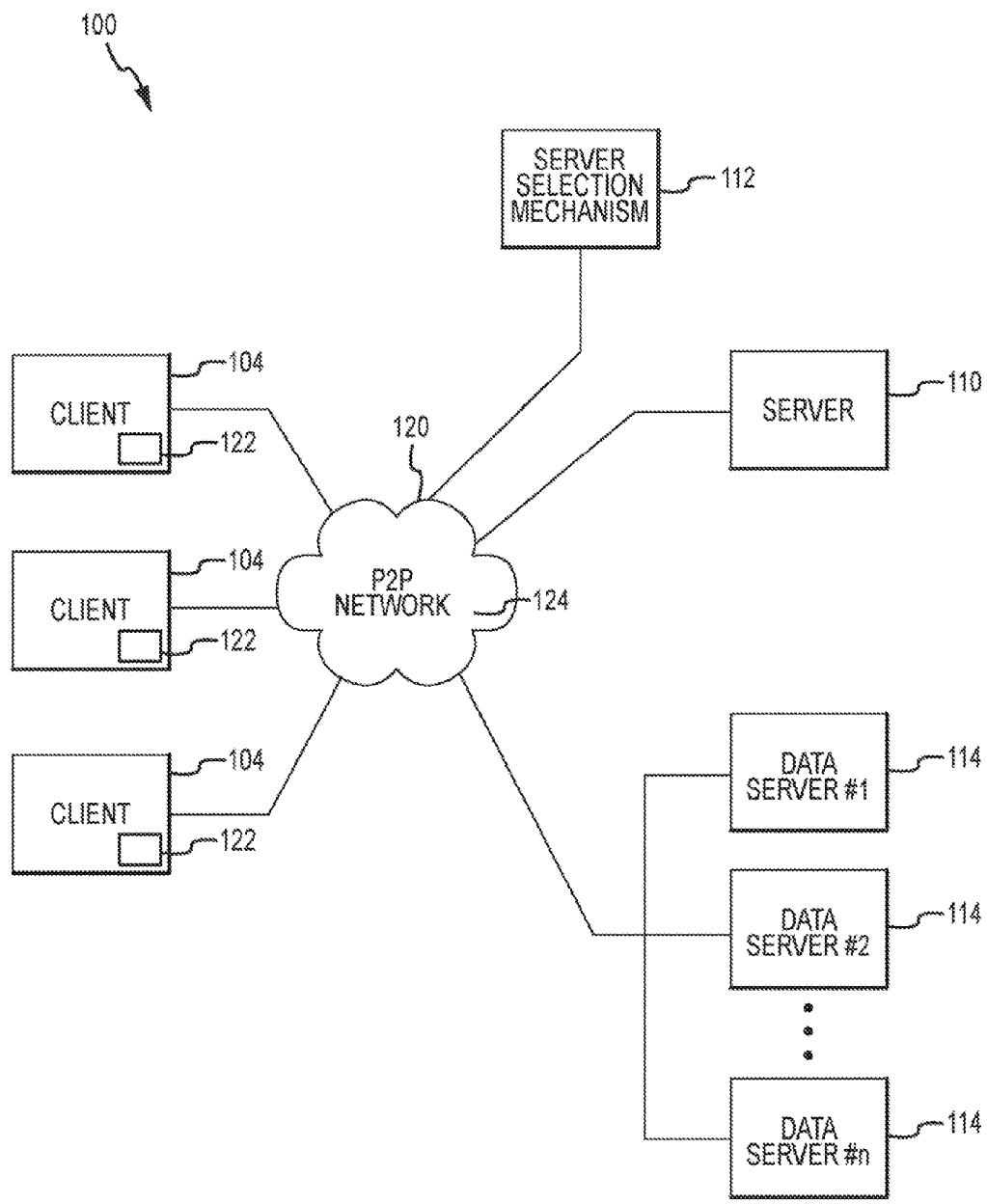
FIG. 1 is a block diagram of a data communication system according to various aspects of the present invention.

Methods and apparatus for transferring data according to various aspects of the present invention may operate in conjunction with a peer-to-peer (p2p) system. Certain representative implementations may include, for example, a p2p network 124, a data retrieval system, a distributed computing system, etc. Referring to FIG. 1, a p2p system 100 according to various aspects of the present invention may comprise multiple computers exchanging data. For example, the present exemplary p2p system 100 comprises multiple clients 104 connected to each other and one or more remote servers 110, server selection mechanisms 112, and/or data servers 114 via a communications medium 120. Data is transferred among the various clients 104, servers 110, server selection mechanisms 112, and/or other data servers 114 via the communications medium 120.

The present embodiment may include one or more servers 110 that may operate as data servers 114 and provide other appropriate functions. The servers 110 may comprise any suitable computer systems or other electronic devices configured to communicate via the medium 120. For example, the servers 110 may comprise hardware, software, and/or networking components configured to receive and process requests from the clients 104 and provide a suitable website or other Internet-based user interface which is accessible by the clients 104. In one embodiment, the server 110 comprises a convention networked computer server running an operating system, such as Microsoft Windows, Mac OSX, or Linux, and a web server, such as an Apache web server. The server 110 may comprise a daemon or software application, a physical computer that is connected to a network, and/or a combination of software and hardware.

The clients 104 may receive, store, and/or transmit information via the medium 120. The clients 104 may comprise any suitable systems for communicating over a network or providing access to data that resides locally on the client 104. For example, one or more clients 104 may comprise conventional computers having a processor and a storage system, such as RAM, hard drives, CD-ROM drives and disks, HD-DVD drives and disks, or other appropriate volatile or nonvolatile memory system. Alternatively, the client 104 may comprise a television, stereo, radio, telephone, personal digital system, gaming console, personal media player, digital assistant, or other network-connected device that receives digital or analog media content.

In the present embodiment, the clients 104 execute software for requesting and providing information via the medium 120. For example, each client 104 may comprise a conventional computer system that runs an operating system, such as Microsoft Windows, Mac OSX, Windows CE, Windows XP Embedded, Linux or other PC or embedded operating system, and is capable of executing software and connecting to a network. The client 104 may connect to the network in any suitable manner, including via a network cable connection or a wireless connection. Also, the client 104 may communicate through the network using any appropriate communication protocols, such as TCP/IP, UDP, etc.

The clients 104 may operate client applications 122 to receive data via the medium 120. The client applications 122 may comprise any software or other system capable of requesting and/or receiving data via the medium 120. The client applications 122 may also request any appropriate data, such as digital data encoded in a particular format, such as a QuickTime video file, MP3 file, PostScript file, or Microsoft Windows executable file, that may be used by the client application 122 or another application to perform tasks. For example, the client application 122 may display information on a computer screen, play sounds through a soundcard, play or patch a game, transmit data to another device such as a computer or television, download and/or otherwise prepare data for use by another application, or otherwise use downloaded data. The client application 122 may comprise, for example, a media player, a downloading program, a file-sharing program, a game, or other suitable program. In the present embodiment, the client application 122 includes a BitTorrent client that utilizes the BitTorrent protocol or other appropriate p2p protocol for data transfer. In another embodiment, the client application 122 may comprise a web browser, and may operate in conjunction with one or more plug-in programs that interact with the web browser. The plug-in may operate as separate code from the main program, for example to read or edit specific types of files, such as to play and watch Flash presentations in the web browser.

For example, the client application 122 may comprise a BitTorrent client application 122 that is capable of connecting to a BitTorrent p2p network and retrieving file contents. The client application 122 may be configured to initially retrieve a file or webpage from the server 110 or some other data source that contains information describing a file to be downloaded and provides information that allows the file to be retrieved from the BitTorrent p2p network 124. The client applications 122 are suitably configured to connect to the server 110 to retrieve the data that describes the file to be retrieved by the client application 122.

In the present embodiment, the data to be retrieved from the server 110 may comprise a torrent file that contains sufficient data to allow client application 122 to retrieve the file from a BitTorrent p2p network. The client application 122 may be configured to use the data to connect to a p2p network 124 to retrieve segments of the file to be downloaded. While downloading a particular file from the p2p network 124, the client application 122 may identify those file segments that have not yet been retrieved and connect to other clients 104 to retrieve those file segments. Furthermore, in one exemplary embodiment, the client application 122 may determine whether a particular file segment is available from the p2p network 124 and the rate at which the file segment can be retrieved from its source.

The client application 122 may be configured to retrieve a p2p file description from the server 110 or other data source. The p2p file description describes the file and provides sufficient data such that the file may be retrieved from the p2p network 124, such as from the clients 104, data servers 114, and/or other data sources. For example, the client application 122 may retrieve a webpage from the server 110 that contains an HTML tag, such as an <EMBED> tag, that instantiates a file-using program and contains sufficient data to retrieve the file from the p2p network 124. The <EMBED> tag may include a p2p file description containing all the information required to retrieve a file from the p2p network 124. For example, for a BitTorrent network, the <EMBED> tag may describe the URL of a tracker and/or index that monitors the clients 104 that are connected to the p2p network 124 and are distributing file segments, the name of the file, the size of the file segments, the size of the file, and other information that allows the client application 122 to verify the integrity of the file segments retrieved from the p2p network 124.

The files may comprise any suitable collections of information collected under a particular name, such as conventional computer files. The files may include subfiles or any other appropriate structure. In addition, the information in the files may be any appropriate information, such as data for sound, video, program data, patch information, game data, or the like. In many cases, to distribute a file, the clients 104 of the p2p network 124 split a file into a series of file segments, such as in accordance with conventional BitTorrent distribution. The size of the file segments may be determined by several factors, including the performance of the medium 120 through which the clients 104 of the p2p network 124 communicate, the size of the original file, or other factors. When a client 104 wishes to retrieve a particular file from the p2p network 124, the client 104 can communicate with other clients 104 of the p2p network 124 to retrieve particular file segments that comprise the file. The clients 104 may then retrieve those file segments and can combine them to recreate the original file.

The communications medium 120 facilitates the transfer of information, and may comprise any suitable medium for transferring information. For example, the communications medium 120 may comprise the Internet, a local area network or any other suitable wired or wireless communications network. In the present embodiment, the medium 120 includes a p2p network 124 comprising multiple devices configured to exchange information, such as using a BitTorrent protocol to distribute digital files. The p2p network 124 may, however, comprise a network of computers using alternative systems for communicating and distributing data or files via the medium 120, such as Microsoft's Avalanche system, Skype, Gnutella, Napster, or any other appropriate data or file distribution system. The p2p network 124 may be suitably configured to communicate with the clients 104 such that the client 104 is capable of retrieving file segments from the p2p network 124.

The server selection mechanism 112 monitors the availability of the various file segments via the p2p network 124 and may adjust the availability of the file segments according to any appropriate criteria. Availability refers to the ability of the p2p network 124 to supply a requested file segment within a time period in response to a request. Thus, if a file segment can be supplied by a data source in response to a request within shorter time period, the file segment has higher availability. Conversely, if the file segment is slowly delivered or is not delivered at all in response to the request, the file segment has lower availability. Availability may reflect and be affected by several factors, such as the number of data sources offering a segment, the speed of the relevant data sources, and the current demand for the file segment.

In the present embodiment, the server selection mechanism 112 may be accessed, for example by the client applications 122 and/or clients 104, to receive and process file requests. The server selection mechanism 112 may comprise any suitable mechanism, device or machine. For example, the server selection mechanism 112 may comprise a computer system configured to communicate via the medium 120. The server selection mechanism 112 may comprise hardware, software, and/or networking components, such as an Internet-accessible computer.

In an embodiment in which the p2p network 124 comprises a BitTorrent network, the server selection mechanism 112 may comprise a computer that is connected to the p2p network 124 and operating as a conventional tracker and/or index. The server selection mechanism 112 may keep a record of which file segments are available from which p2p network clients 104. In addition, the server selection mechanism 112 may generate statistical data describing the availability of various file segments on the p2p network 124.

The server selection mechanism 112 may determine the availability of file segments on the p2p network in any appropriate manner. For example, the server selection mechanism 112 may determine whether various file segments are available via the p2p network by identifying a number of data sources, such as clients 104 and data servers 114, that offer a particular file segment at a particular time. The server selection mechanism 112 may also monitor other file distribution characteristics that may affect the availability of a file segment, such as the response time of various data sources for providing a file segment in response to a request, the bandwidth of the data sources, the busyness of the data sources, the number of requests received for a particular file segment, the frequency of such requests, the current demand for a particular file segment, and the like.

In one embodiment, the server selection mechanism 112 may monitor the number of file segments that are available on a p2p network 124 and the number of clients 104 that are making the file segments available. The server selection mechanism 112 may, for example, monitor the clients 104 and client applications 122 that comprise the p2p network 124, as well as the file segments that each client 104 makes available to the other users of the p2p network 124. Furthermore, the server selection mechanism 112 may monitor the performance characteristics of the p2p network 124, such as the transfer rate of particular file segments from particular hosts 104 that are connected to the p2p network 124. The server selection mechanism 112 may monitor availability in any manner, such as by querying the client applications 122 regarding fulfillment of requests, generating dummy requests for file segments to test response times, tracking the number of data sources offering particular file segments, and/or other appropriate techniques.

Further, the server selection mechanism 112 may determine availability according to information from the clients 104. For example, the client application 122 may request a file segment and determine that one or more file segments do not have satisfactory availability (e.g., no or few peers are sharing the particular file segment, or the performance in retrieving the file segment is unsatisfactory). The client application 122 may contact the server selection mechanism 112 to assert the unacceptable performance and request access to additional resources, such as contact information for a supplementary data server 114 that may provide access to the file segment.

The server selection mechanism 112 may then respond to the notice of the unacceptable performance by adjusting the availability of the content.

The server selection mechanism 112 may adjust the availability of a file or file segment in any suitable manner and according to any suitable criteria, such as in response to a lower availability of the file or file segment. For example, the server selection mechanism 112 may compare an availability value representing the availability of the relevant data to a threshold, such as a maximum response time or a minimum number of data sources offering the relevant data. The server selection mechanism 112 may then adjust the availability accordingly. The server selection mechanism 112 may adjust the file segment's availability according to any appropriate criteria, such as the number of data sources offering the relevant file segment, the response times of the data sources offering the relevant file segment, a cost associated with the data sources, or other appropriate criteria.

The server selection mechanism 112 may adjust the availability in any appropriate manner, such as improving the performance of existing data sources or adding data sources to the p2p network 124. For example, the server selection mechanism 112 may adjust the number of data sources offering a file segment by identifying additional data sources as being available and/or initiating additional data sources. In addition, the server selection mechanism 112 may improve the response times of the available data sources by identifying and/or activating higher speed data sources for providing the relevant file segments. The server selection mechanism 112 may also reduce the availability of file segments, for example by retiring data servers 114 by deactivating them or ignoring them, for example when demand for content decreases or availability of the relevant data from other data sources increases.

For example, if a file segment's availability value decreases below a selected threshold such that network performance is significantly degraded, the server selection mechanism 112 may add a data server 114 as a peer to the p2p network 124 to increase its performance. After adding the data server 114 to the p2p network 124, the data server 114 becomes a peer of the p2p network 124 that makes available those file segments that are least available on the p2p network 124.

The server selection mechanism 112 may add or subtract data sources in any appropriate manner, such as by identifying existing data sources and/or spawning new data sources for access by the p2p network 124. In one embodiment, the server selection mechanism 112 may add data sources by activating one or more data servers 114 from a set of candidate data servers 114. For example, the server selection mechanism 112 may initially access a list of potential data sources servers 114. The list may be stored in any fashion, such as in conjunction with a list of electronically stored data that may be accessed locally by the server selection mechanism 112 or accessed through a network. In one embodiment, the server selection mechanism 112 comprises an electronically accessible list of potential data servers 114. The list may be accessible by the client application 122 such that the client application 122 can request a particular data server 114, or may be isolated from the client application 122. The list may comprise any suitable data that is capable of describing a potential data source coupled to the medium 120. For example, the list may contain the IP addresses or URLs of potential data servers 114 that are connected to the medium 120. Furthermore, the list may contain information relating to the candidate data servers 114, such as performance characteristics for the various data servers 114 and the costs associated with the use of any of the listed potential data servers 114.

In one embodiment, the server selection mechanism 112 may store or otherwise have access to a local lookup file. The local lookup file may contain information describing potential data servers 114. The list may further contain additional information that relates to the listed data servers 114, such as performance characteristics and cost associated with using the data servers 114. In allocating additional data servers 114, the server selection mechanism 112 may consult the list of potential data servers 114 and select data servers 114 for activation according to selected criteria, such as the performance of the data server 114 and/or costs associated with using a particular data server 114, to determine which data servers 114 to use, the number of data servers 114 to make available, and the extent to which they may provide access to content.

In adding, subtracting, or adjusting data sources of the p2p network 124, the server selection mechanism 112 may consider any appropriate criteria, such as current p2p network 124 performance characteristics, costs associated with using particular data servers 114 or other data sources, and the like. For example, upon receiving a message from a client application 122 requesting access to a file segment, the server selection mechanism 112 may consult the list of potential data servers 114 and, depending upon network performance characteristics, such as the number of file segments that are unavailable, the number of clients 104 that are requesting access to additional data servers, goals relating to p2p network 124 user experience, cost limitations, etc., and any other relevant factors, such as the cost associated with using any of the data servers 114, provide contact information for one or more of the data servers 114 to the client application 122. The client application 122 may then request the desired data from the identified data server 114.

The present embodiment includes one or more data servers 114 that may operate as data sources and/or provide other appropriate functions. The data server 114 may comprise any data source configured to communicate via the medium 120. For example, the data servers 114 may comprise hardware, software, and/or networking components configured to receive and process requests from the clients 104 and provide a suitable website or other Internet-based interface which is accessible by the clients 104 and the client application 122. In one embodiment, the data server 114 comprises a computer running an operating system (i.e. MS Windows, Mac OSX, Linux, etc.) and a web server (i.e. Apache, etc.). The data server 114 may also be capable of storing information that describes the file that is to be delivered to the client application 122. The data sources 122 may comprise any suitable systems for providing data, such as a local storage media, networked storage systems and computers, web servers, databases, loopback network interfaces, cameras, PDAs, televisions, radios, and/or other recording or audiovisual systems, and the like.

The data servers 114 may comprise multiple computers that are connected to the medium 120 using different service providers, such that different data servers 114 may be accessed at different costs. Alternatively, the data server 114 may comprise a single computer that contains multiple network connection devices that are each coupled to the medium 120 through different service providers, which may be accessed through the medium 120 in different ways that incur different costs. For example, a single computer server could contain multiple network cards that are each connected to different Internet Service Providers (ISPs).

In one embodiment, the data server 114 comprises a web server that is configured to serve range requests to a client 104 that is connected to the data server 114. Instead of downloading an entire file from the data server 114, a client 104 or a client application 122 may, in its communication with the data server 114, specify a file segment or other subsection of the file to be retrieved. The data server 114 may then only transmit that portion of the file to the client 104 or client application 122. The data server 114 may also comprise a computer configured to communicate using a p2p networking protocol. For example, the data server 114 may comprise a computer that operates using the BitTorrent protocol to distribute files and file segments to other users of the p2p network 124, for example as a peer in the p2p network 124.

Figure 2:
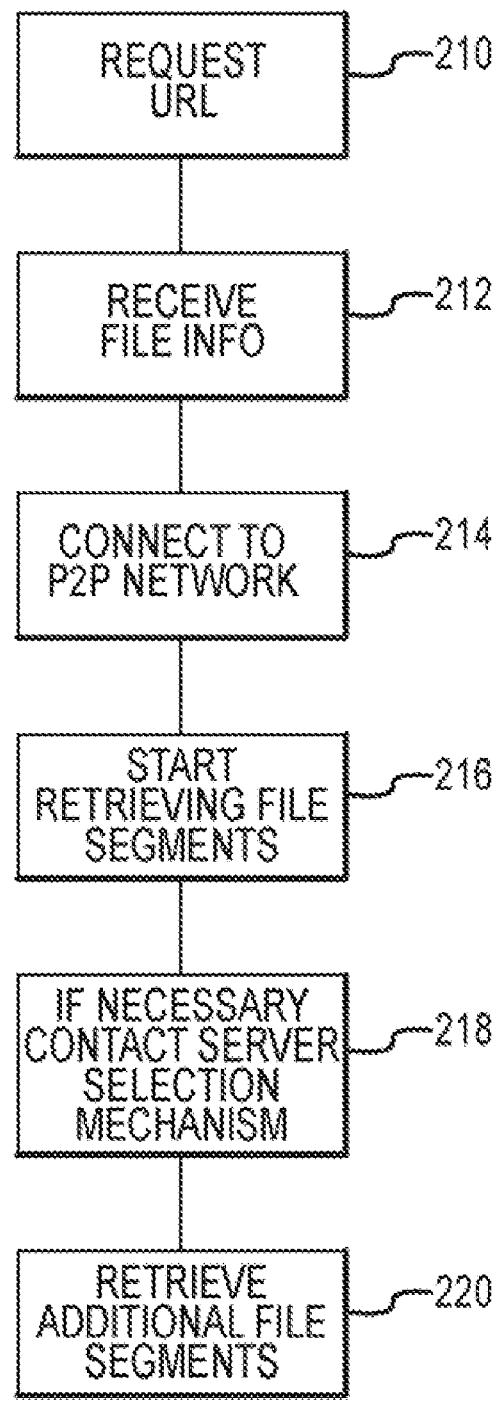
FIGS. 2-5 are flow diagrams of a file distribution system according to various aspects of the present invention.

Referring to FIG. 2, the p2p system 100 may transfer information in response to a request initiated by the client application 122. For example, a web browser operating on the client 104 may request data from a URL via the server 110 (210). The URL corresponds to a file to be retrieved and may reference a webpage containing text and HTML tags, an executable file or script that the server 110 runs and whose output may be transmitted to the client software application 122, and/or a file that contains data. The client application 122 may initially retrieve information relating to the file from the server 110 (212). For example, the information retrieved from the server 110 may contain a description of the file that the client application 122 is attempting to retrieve, such as file size, file name, file type, file encoding information, the address of a tracker and/or index, and/or any other information for retrieving the file from the p2p network 124.

Upon retrieving the information from the server 110, the client application 122 may communicate with the p2p network 124 (214) and begin retrieving segments of the specified file, for example in accordance with the information retrieved from the server 110 (216). The client application 122 suitably locates file segments from the various peers, performs peer negotiation to acquire the file segments, and verifies the integrity of received files. The method used to retrieve the file segments may be determined based upon any appropriate criteria, such as the type of file being retrieved, p2p network 124 performance, and/or requirements of the client application 122.

If the requested file segments are not sufficiently available from the p2p network 124, or if the p2p network 124 performance is sufficiently degraded, the server selection mechanism 112 may adjust the availability of the file segments or otherwise adjust the p2p network 124 performance. For example, the client application 122 may contact the server selection mechanism 112 to request an alternative data source from which to retrieve file segments (218). This may occur, for example, if the requested file segment is not available from any of the clients 104 connected to the p2p network 124, or if the retrieval time of the requested file segment exceeds of some threshold. For example, if the download rate for a particular file segment is less than half of the average download rate of all other segments and/or below a selected threshold, the client application 122 may contact the server selection mechanism 112 to determine an alternative data server 114 from which to retrieve the file segment.

Figure 3:
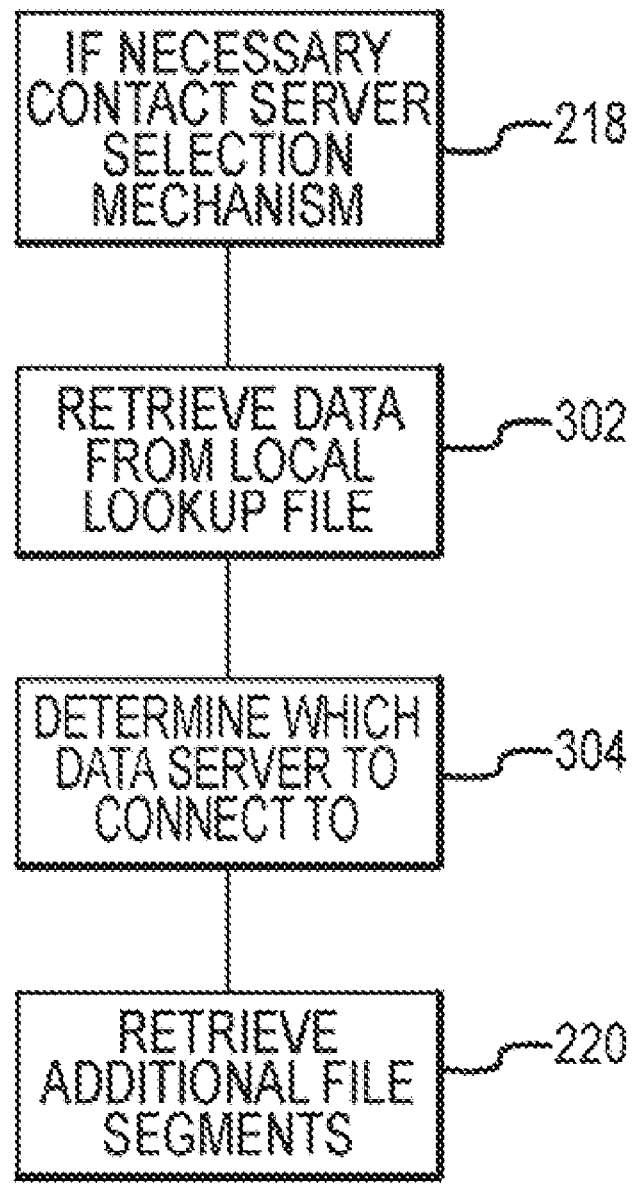

For example, referring to FIG. 3, when the client application 122 determines that a file segment is not adequately available (218), the client application 122 may retrieve data regarding candidate data servers 114 from the local lookup file (302). If more than one potential data server 114 is available, the client application 122 may use various data that describe, among other things, the p2p network 124 to determine which data server 114 or servers 114 to use (304). For example, if the number of file segments that are not adequately available on the p2p network 124 is above a particular threshold, the client application 122 may elect to use a more expensive and/or better performing (both in bandwidth and uptime) data server 114. If the performance of a particular data server 114 does not satisfy particular thresholds, the client application 122 may further elect to employ a less expensive data server 114 to retrieve missing file segments.

Figure 4:
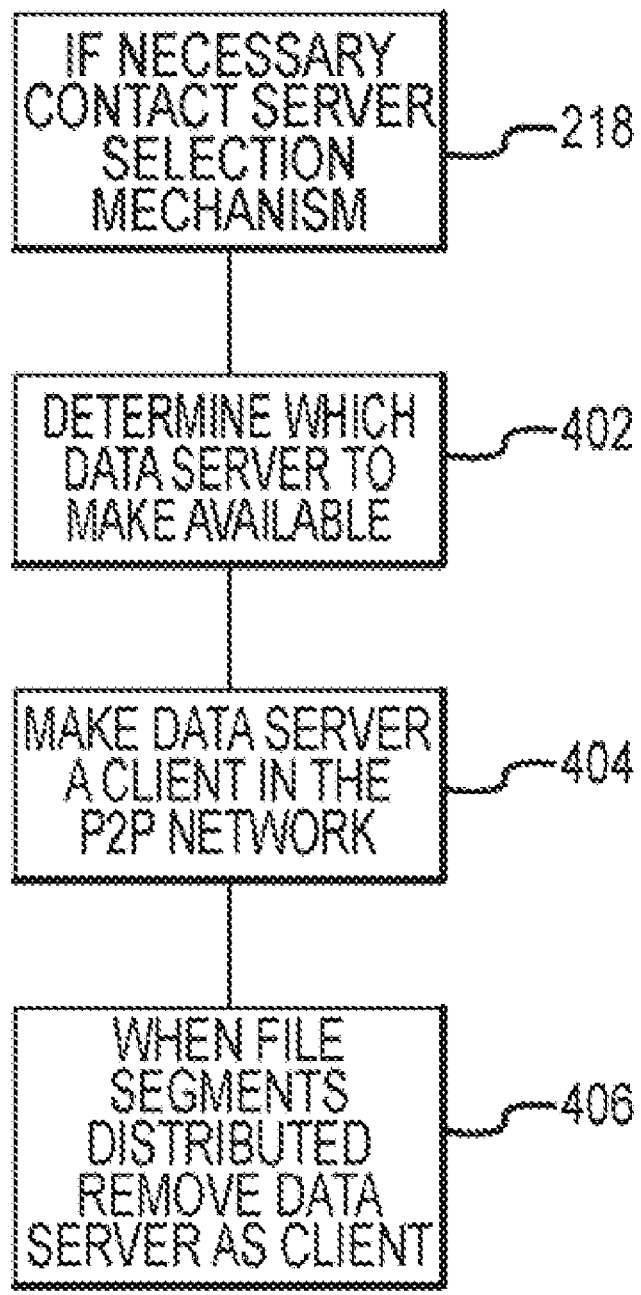

In addition, referring to FIG. 4, the server selection mechanism 112 determine when a particular file segment is unavailable or insufficiently available on the p2p network 124, such as when file segments are only available from a small number of peers having minimal bandwidth. Upon determining that file segments are not adequately available (218), the server selection mechanism 112 may select one or more data servers 114 to make available to the p2p network 124 (404). The determination of which data server 114 to make available may be based upon one or more criteria (402). For example, if the missing file segment is at least minimally available on the p2p network, even though it may only be available from clients 104 having low bandwidth capabilities, the server selection mechanism 112 may make a data server 114 available that itself has minimal bandwidth and uptime characteristics, thereby minimizing the associated cost of using the data server 114. However, if the file segment is entirely absent from the p2p network 124 and many clients 104 are in need of the file segment, the server selection mechanism 112 may make a data server 114 having substantial bandwidth and uptime capabilities available to distribute the file segment to the p2p network 124. Although the cost may be substantially increased, the missing file segment quickly distributed through the p2p network 124. When the file segment becomes sufficiently available, such as when sufficient clients 104 have a copy of the missing file segment and can themselves begin distributing it, the server selection mechanism 112 may remove the data server 114 from the p2p network 124 (406).

Figure 5:
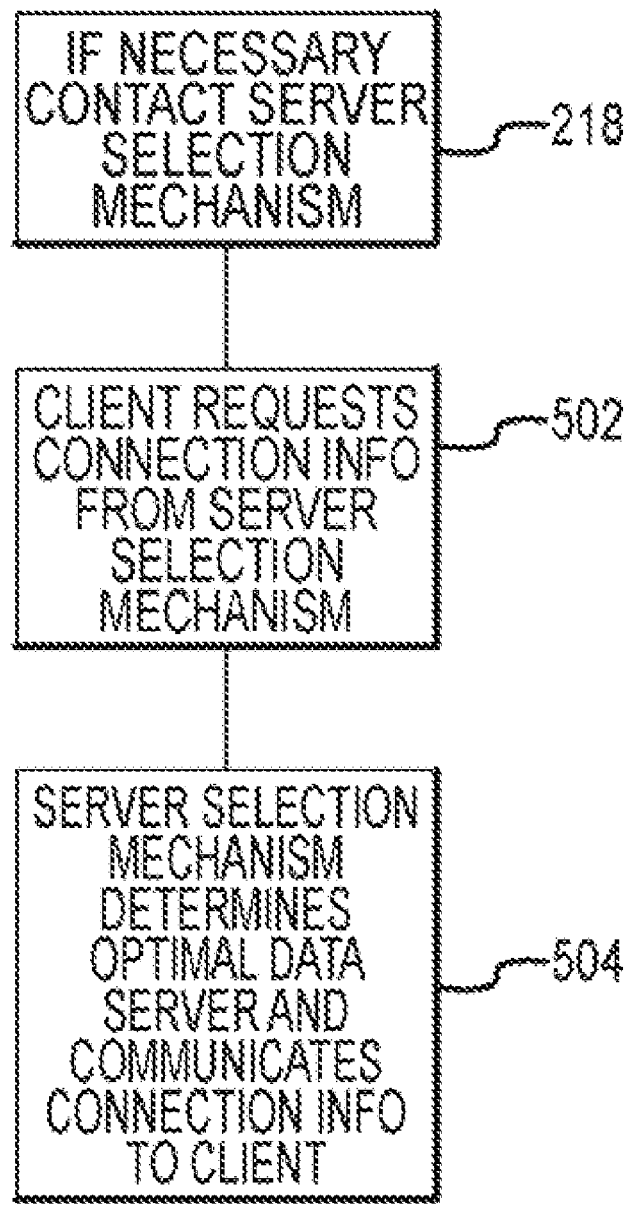

Furthermore, referring to FIG. 5, upon discovering that a file segment is not sufficiently available through the p2p network 124 (218), the client application 122 may send a request to the server selection mechanism 112 (502) requesting contact information for an alternative data server 114 from which to retrieve the file segment. Upon receiving a request from a client application 122, the server selection mechanism 112 may consult a list of potential data servers 114 in conjunction with other available data to determine the data server 114 to which the client application 122 should connect (504). After analyzing the available data, however, the server selection mechanism 112 may determine that an additional data server 114 is not necessary and may instruct the client 104 to continue retrieving the file segment from the p2p network 124 clients 104.

If the server selection mechanism 112 determines that an additional data server 114 should be made available, the server selection mechanism 112 may analyze data, such as the number of client applications 122 that are making requests for the same file segment, the number of clients 104 that are part of the p2p network 124, the performance history of any clients 104 that are making the file segment available (e.g., whether they have a low-bandwidth connection, whether they are only connected to the p2p network 124 for short periods of time, etc.), and any other suitable information. Furthermore, the server selection mechanism 112 may consult additional information, such as the importance of providing a satisfactory user experience. For example, in a commercial setting, it may be necessary to ensure that the users of a p2p network 124 consistently have high-bandwidth access to file segments of a file. In such a case, the server selection mechanism 112 may allow client application 122 to connect to data servers 114 having faster and more reliable connections even though their cost is increased. In other circumstances, the user experience may not be as important and the server selection mechanism 112 may only make lower bandwidth data servers 114 available to client applications 122 to save costs.

Referring again to FIG. 2, upon connecting to the data server 114, the client application 122 may retrieve data from the data server 114 in any suitable manner (220). For example, to retrieve a portion of the file, the client application 122 may make a range request to a web server that is running on the data server 114, or that has access to the data that resides on the data server 114. In that case, the client application 122 may only retrieve the portion of the file that is currently unavailable on the p2p network 124, or may retrieve additional portions of the file as necessary. In an alternate embodiment, the client application 122 may retrieve data from the data server 114 using a p2p file transfer protocol. For example, the client application 122 may employ the BitTorrent protocol to retrieve the file segments that are currently unavailable on the p2p network 124.

In the foregoing specification, the invention has been described with reference to specific exemplary embodiments. Various modifications and changes may be made without departing from the scope of the present invention as set forth in the exemplary embodiments. The specification and figures are to be regarded in an illustrative manner rather than a restrictive one, and all such modifications are intended to be included within the scope of the present invention. For example, the steps recited in any method or process embodiments may be executed in any appropriate order and are not limited to the specific order presented in the exemplary embodiments. Additionally, the components and/or elements recited in any apparatus embodiment may be assembled or otherwise operationally configured in a variety of permutations to produce substantially the same result as the present invention and are accordingly not limited to the specific configuration recited in the exemplary embodiments.

Benefits, other advantages and solutions to problems have been described above with regard to particular embodiments. Any benefit, advantage, solution to problems or any element that may cause any-particular benefit, advantage or solution to occur or to become more pronounced, however, are not to be construed as critical, required or essential features or components of any or all the exemplary embodiments.

The terms "comprises", "comprising", "including", or any variation, refer to a nonexclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

The invention claimed is:

1. A computer system configured to facilitate transfer of a file having at least one segment via a p2p network, the system comprising:

a processor having access to the p2p network; and a memory responsive to the processor, wherein the memory stores a p2p communication program configured to cause the computer system to:

monitor an availability of the at least one file segment via the p2p network;
automatically adjust the availability of the at least one file segment via the p2p network according to the availability of the at least one file segment, comprising:
selecting a supplementary data source from a set of multiple candidate data sources according to at least one of:
a bandwidth of the supplementary data source; and
a cost associated with transferring data via the supplementary data source; and
making the supplementary data source available via the p2p network, wherein the supplementary data source offers the at least one file segment for transfer;
receive a request for the at least one file segment via the p2p network; and
refer the request for the at least one file segment to the selected supplementary data source.

2. The computer system according to claim 1, wherein causing the computer system to monitor the availability of the at least one file segment includes causing the computer system to receive a request for a supplementary data source from a peer in response to a low availability of the at least one file segment on the p2p network.

3. The computer system according to claim 1, wherein the at least one file segment is a BitTorrent file segment.

4. A method for transferring a file having multiple segments via a p2p network, comprising:
monitoring an availability of at least one of the file segments via the p2p network; and
automatically adjusting the availability of the at least one file segment via the p2p network according to the availability of the at least one file segment, comprising:
selecting a supplementary data source from a set of multiple candidate data sources according to at least one of:
a bandwidth of the supplementary data source: and
a cost associated with transferring data via the supplementary data source; and
making the supplementary data source available via the p2p network,
wherein the supplementary data source offers the at least one file segment for transfer;

receiving a request for the at least one file segment via the p2p network; and
referring the request for the at least one file segment to the selected supplementary data source.

5. The method for transferring a file according to claim 4, wherein monitoring the availability of the at least one file segment comprises receiving a request for a supplementary data source from a peer in response to a low availability of the at least one file segment on the p2p network.

6. The method for transferring a file according to claim 4, wherein the at least one file segment is a BitTorrent file segment.

7. A non-transitory medium storing computer-executable instructions, wherein the instructions are configured to cause a computer coupled to a p2p network to:
monitor an availability of at least one file segment via the p2p network; and
automatically adjust the availability of the at least one file segment via the p2p network according to the availability of the at least one file segment, comprising
selecting a supplementary data source from a set of multiple candidate data sources according to at least one of:
a bandwidth of the supplementary data source; and
a cost associated with transferring data via the supplementary data source;
making the supplementary data source available via the p2p network,
wherein the supplementary data source offers the at least one file segment for transfer;
receive a request for the at least one file segment via the p2p network; and
refer the request for the at least one file segment to the selected supplementary data source.

8. The non-transitory medium according to claim 7, wherein causing the computer to monitor the availability of the at least one file segment includes causing the computer to receive a request for a supplementary data source from a peer in response to a low availability of the at least one file segment on the p2p network.

9. The non-transitory medium according to claim 7, wherein the at least one file segment is a BitTorrent file segment.

* * * * *